US009817289B2

(12) United States Patent
Park et al.

(10) Patent No.: US 9,817,289 B2
(45) Date of Patent: Nov. 14, 2017

(54) LIQUID CRYSTAL DISPLAY

(71) Applicant: Samsung Display Co., Ltd., Yongin, Gyeonggi-Do (KR)

(72) Inventors: Seung Hyun Park, Seoul (KR); Hyang Yul Kim, Hwaseong-si (KR); Sung In Ro, Hwaseong-si (KR); Jun Ho Song, Seongnam-si (KR); Jean Ho Song, Yongin-si (KR); Woong Ki Jeon, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 175 days.

(21) Appl. No.: 14/272,751

(22) Filed: May 8, 2014

(65) Prior Publication Data

US 2014/0362322 A1    Dec. 11, 2014

(30) Foreign Application Priority Data

Jun. 11, 2013    (KR) .................... 10-2013-0066749

(51) Int. Cl.
*G02F 1/136*    (2006.01)
*G02F 1/1333*    (2006.01)
(Continued)

(52) U.S. Cl.
CPC .. *G02F 1/136286* (2013.01); *G02F 1/133512* (2013.01); *G02F 1/134363* (2013.01); *G02F 2201/52* (2013.01)

(58) Field of Classification Search
CPC ............. G02F 1/136286; G02F 1/1368; G02F 1/133707; G02F 1/134309; G02F 1/134363; G02F 2201/40; G02F 1/136209; G02F 2001/134345; G02F 1/133514; G02F 1/13; G09G 2300/0426; G09G 3/3648; G09G 2320/0233
See application file for complete search history.

(56) References Cited

U.S. PATENT DOCUMENTS 6,577,368 B1    6/2003  Yuh et al.
8,294,647 B2   10/2012  Chen et al.
(Continued)

FOREIGN PATENT DOCUMENTS

JP    2003-202580 A    7/2003
JP    2009-229791 A    10/2009
(Continued)

*Primary Examiner* — Huyen Ngo
(74) *Attorney, Agent, or Firm* — Cantor Colburn LLP

(57) ABSTRACT

A liquid crystal display includes a plurality of pixels including first, second and third pixels that display different colors and are sequentially disposed, a plurality of data lines including first, second and third data lines sequentially and repeatedly disposed where the first data line is disposed between the third pixel and the first pixel, the second data line is disposed between the first pixel and the second pixel, and the third data line is disposed between the second pixel and the third pixel, widths of the first, second and third data lines are substantially the same as each other, and a first interval between the first data line and the second data line is different from a second interval between the second data line and the third data line or a third interval between the third data line and the first data line.

24 Claims, 7 Drawing Sheets

(51) Int. Cl.
    *G02F 1/1343*     (2006.01)
    *G02F 1/1362*     (2006.01)
    *G02F 1/1335*     (2006.01)

(56) References Cited

U.S. PATENT DOCUMENTS

| | | | |
|---|---|---|---|
| 9,316,873 B2* | 4/2016 | Huh | G02F 1/133707 |
| 2004/0066481 A1* | 4/2004 | Hong | G02F 1/134363 |
| | | | 349/141 |
| 2007/0019145 A1 | 1/2007 | Rho et al. | |
| 2008/0231779 A1 | 9/2008 | Shin et al. | |
| 2010/0085287 A1* | 4/2010 | Shimomaki | G02F 1/134363 |
| | | | 345/87 |
| 2010/0321607 A1 | 12/2010 | Utsumi et al. | |
| 2011/0149213 A1 | 6/2011 | Han et al. | |
| 2012/0008073 A1 | 1/2012 | Ota | |
| 2012/0013817 A1* | 1/2012 | Kim | G02F 1/134363 |
| | | | 349/41 |
| 2013/0242221 A1* | 9/2013 | Nishida | G02F 1/1323 |
| | | | 349/43 |
| 2014/0054624 A1* | 2/2014 | Chen | G09G 3/32 |
| | | | 257/89 |

FOREIGN PATENT DOCUMENTS

| | | |
|---|---|---|
| KR | 1020040068398 A | 7/2004 |
| KR | 100670037 B1 | 1/2007 |
| KR | 1020110075718 A | 7/2011 |

* cited by examiner

LIQUID CRYSTAL DISPLAY

This application claims priority to Korean Patent Application No. 10-2013-0066749 filed on Jun. 11, 2013, and all the benefits accruing therefrom under 35 U.S.C. §119, the entire contents of which are incorporated herein by reference.

BACKGROUND (1) Field

The invention relates to a liquid crystal display.

(2) Description of the Related Art

A liquid crystal display, which is one of the most widely used flat panel displays, is a display adjusting an amount of transmitted light by re-aligning liquid crystal molecules of a liquid crystal layer by applying a voltage to an electrode.

The liquid crystal display has an advantage in that the liquid crystal display is easily formed to be thin, but has a disadvantage in that a side visibility deteriorates, compared to a front visibility. In order to overcome the disadvantage, various liquid crystal alignments and driving methods have been developed. As a method of implementing the wide viewing angle, a liquid crystal display in which a pixel electrode and a common electrode are formed on one substrate has attracted attention.

SUMMARY

The invention has been made in an effort to provide a liquid crystal display improving a color reproduction property thereof and having no deterioration of a display quality.

An exemplary embodiment of the invention provides a liquid crystal display including a plurality of pixels including a first pixel, a second pixel and a third pixel, which display different colors and are sequentially disposed, a plurality of data lines including a first data line, a second data line and a third data line sequentially and repeatedly disposed, and a first pixel electrode disposed at the first pixel, a second pixel electrode disposed at the second pixel and a third pixel electrode disposed at the third pixel where the first data line is disposed between the third pixel and the first pixel, the second data line is disposed between the first pixel and the second pixel, and the third data line is disposed between the second pixel and the third pixel, widths of the first data line, the second data line and the third data line are substantially the same as each other, and a first interval between the first data line and the second data line is different from a second interval between the second data line and the third data line or a third interval between the third data line and the first data line.

The liquid crystal display may further include a common electrode overlapping the first pixel electrode, the second pixel electrode and the third pixel electrode where an overlapping area between the first pixel electrode and the common electrode is the same as an overlapping area between the second pixel electrode and the common electrode, and the overlapping area between the second pixel electrode and the common electrode is the same as an overlapping area between the third pixel electrode and the common electrode.

The first pixel electrode, the second pixel electrode and the third pixel electrode may include a plurality of branch electrodes, widths of and intervals between the plurality of branch electrodes of the first pixel electrode may be substantially the same as widths of and intervals between the plurality of branch electrodes of the second pixel electrode, and the widths of and the intervals between the plurality of branch electrodes of the second pixel electrode may be substantially the same as widths of and intervals between the plurality of branch electrodes of the third pixel electrode.

A number of plurality of branch electrodes of the first pixel electrode may be different from a number of plurality of branch electrodes of the second pixel electrode or a number of plurality of branch electrodes of the third pixel electrode.

The second pixel electrode may further include a first protrusion provided with no opening, and the third pixel electrode may further include a second protrusion provided with no opening.

The first pixel electrode, the second pixel electrode and the third pixel electrode may include a plurality of branch electrodes, widths of and intervals between the plurality of branch electrodes of the first pixel electrode may be different from widths of and intervals between the plurality of branch electrodes of the second pixel electrode, and the widths of and the intervals between the plurality of branch electrodes of the second pixel electrode may be different from widths of and intervals between the plurality of branch electrodes of the third pixel electrode.

The liquid crystal display may further include a first thin film transistor ("TFT") connected with the first data line and the first pixel electrode, a second thin film transistor connected with the second data line and the second pixel electrode and a third thin film transistor connected with the third data line and the third pixel electrode where a channel width and a channel length of the first thin film transistor is the same as a channel width and a channel length of the second thin film transistor, and the channel width and the channel length of the second thin film transistor is the same as a channel width and a channel length of the third thin film transistor.

The liquid crystal display may further include a gate line including a first gate electrode of the first thin film transistor, a second gate electrode of the second thin film transistor and a third gate electrode of the third thin film transistor where the first gate electrode, the second gate electrode, and the third gate electrode may have substantially the same shape, and the first gate electrode, the second gate electrode, and the third gate electrode may be sequentially disposed at a predetermined interval.

A first source electrode of the first thin film transistor may be extended substantially parallel to the first data line, a second source electrode of the second thin film transistor may include a first extended portion overlapping an edge of the second gate electrode, the second data line may be connected with the first extended portion, a third source electrode of the third thin film transistor may include a second extended portion overlapping an edge of the third gate electrode, and the third data line may be connected with the second extended portion.

A first source electrode of the first thin film transistor may be extended substantially parallel to the first data line, a second source electrode of the second thin film transistor may be connected with the second data line through a first oblique portion, a third source electrode of the third thin film transistor may be connected with the third data line through a second oblique portion, and lengths of the first oblique portion and the second oblique portion may be different from each other.

The liquid crystal display may further include a first light blocking member overlapping the first data line, a second light blocking member overlapping the second data line, and a third light blocking member overlapping the third data line where a width of the first light blocking member may be substantially the same as a width of the second light blocking member and a width of the third light blocking member.

The liquid crystal display further include a first light blocking member overlapping the first data line, a second light blocking member overlapping the second data line and a third light blocking member overlapping the third data line where a width of the first light blocking member may be different from a width of the second light blocking member or a width of the third light blocking member.

According to the exemplary embodiment of the invention, it is possible to improve a color reproduction property and effectively preventing display quality deterioration.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
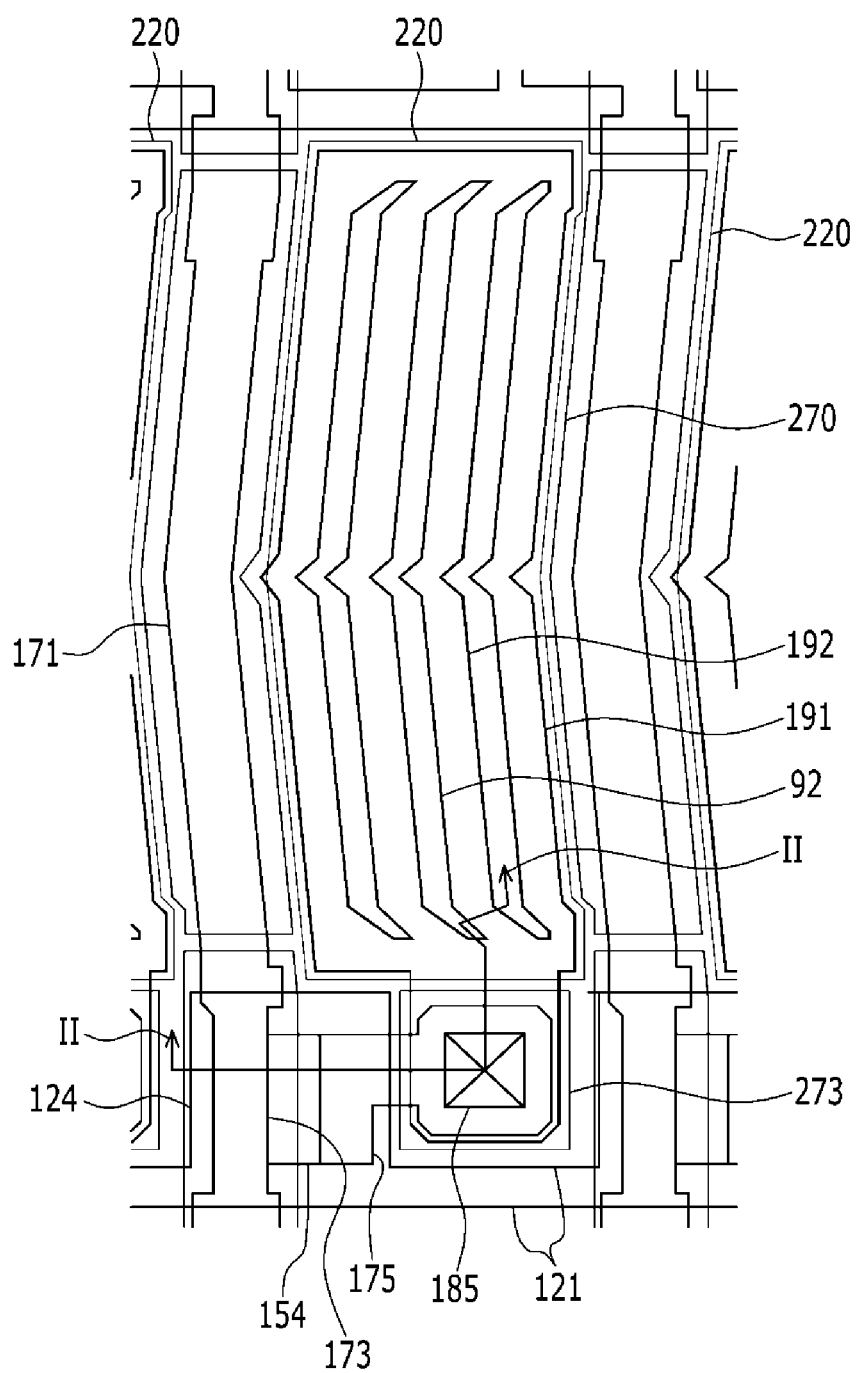
FIG. 1 is a plan view illustrating an exemplary embodiment of one pixel of a liquid crystal display according to the invention.

A liquid crystal display displays a desired image by using a plurality of pixels displaying different colors. In this case, when the same common voltage and data voltage are applied to the respective pixels displaying different colors, brightness may be different according to a color displayed by the pixel, and thus a color reproduction property of the liquid crystal display deteriorates.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, a structure of a liquid crystal display according to an exemplary embodiment of the invention will be described with reference to FIGS. 1 and 2. FIG. 1 is a plan view illustrating one pixel of a liquid crystal display according to an exemplary embodiment of the invention, and FIG. 2 is a cross-sectional view illustrating the liquid crystal display taken along line II-II of FIG. 1.

Figure 2:
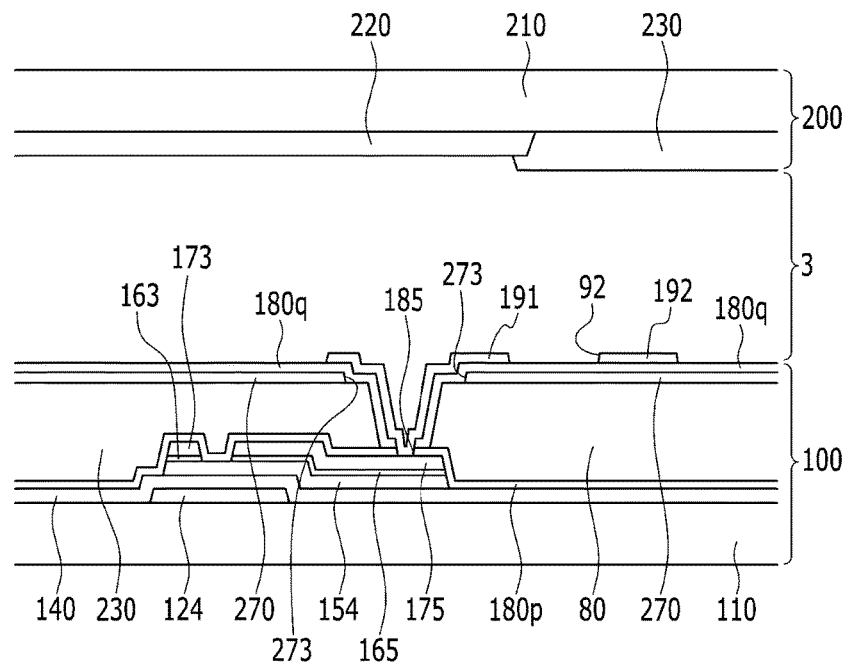
FIG. 2 is a cross-sectional view of the liquid crystal display taken along line II-II of FIG. 1.

Referring to FIGS. 1 and 2, the liquid crystal display according to the exemplary embodiment of the invention includes a lower display panel 100 including a first substrate 110 and an upper display panel 200 including a second substrate 210, which face each other, and a liquid crystal layer 3 disposed therebetween.

Gate conductors including a gate line 121 are disposed on the first substrate 110 including transparent glass or plastic, for example.

The gate line 121 includes a gate electrode 124 and a wide end portion (not illustrated) for a connection with another layer or an external driving circuit. The gate line 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti), for example. However, the invention is not limited thereto, and the gate line 121 may also have a multilayer structure including at least two conductive layers having different physical properties from each other.

A gate insulating layer 140 including silicon nitride (SiNx) or silicon oxide (SiOx) is disposed on the gate conductor 121 and the gate electrode 124. In an exemplary embodiment, the gate insulating layer 140 may also have a multilayer structure including at least two insulating layers having different physical properties from each other.

A semiconductor layer 154 including amorphous silicon or polysilicon is disposed on the gate insulating layer 140. The semiconductor layer 154 may include an oxide semiconductor.

Ohmic contact members 163 and 165 are disposed on the semiconductor 154. The ohmic contact members 163 and 165 may include a material including n+ hydrogenated amorphous silicon in which an n-type impurity such as phosphorus, for example, is doped with a high concentration. However, the invention is not limited thereto, and the ohmic contact members 163 and 165 may include a material including silicide. The ohmic contact members 163 and 165 may be disposed on the semiconductor layer 154 as a pair. In a case where the semiconductor layer 154 is an oxide semiconductor, the ohmic contact members 163 and 165 may be omitted. However, in the case where the semiconductor layer 154 is the oxide semiconductor, in order to effectively prevent diffusion between the material of the semiconductor layer 154 and a material of a layer disposed thereon, a barrier layer may be disposed on the semiconductor layer 154.

A data line 171 including a source electrode 173 and data conductors including a drain electrode 175 are disposed on the ohmic contact members 163 and 165 and the gate insulating layer 140.

The data line 171 includes a source electrode 173 and a wide end portion (not illustrated) for a connection with another layer or an external driving circuit. The data line 171 transmits a data signal, and is mainly extended in a vertical direction to intersect the gate line 121.

The data line 171 may have first curved portions including a curved shape in order to secure maximum transmittance, and the first curved portions may meet at a center area of a pixel area to be provided in a V-shape. Second curved portions bent at a predetermined angle with respect to the first curved portions may be further included in the center area of the pixel area.

The first curved portion of the data line 171 may be bent with an angle of approximately 7 degrees (°) with respect to a vertical reference line which has an angle of approximately 90° with respect to a direction in which the gate line 121 is extended. The second curved portion disposed at the center area of the pixel area may be further bent to have an angle of approximately 7° to approximately 15° with respect to the first curved portion.

The source electrode 173 is a part of the data line 171, and the drain electrode 175 is provided to be extended in substantially parallel to the source electrode 173. Accordingly, the drain electrode 175 is substantially parallel to the part of the data line 171.

The gate electrode 124, the source electrode 173, and the drain electrode 175 constitutes a single thin film transistor ("TFT") together with the semiconductor layer 154, and a channel of the thin film transistor is provided on the semiconductor layer 154 between the source electrode 173 and the drain electrode 175.

The liquid crystal display according to the exemplary embodiment of the invention includes a source electrode 173 disposed on the same line as the data line 171, and the drain electrode 175 extended in substantially parallel to the data line 171, so that it is possible to increase a width of the thin film transistor without increasing an area occupied by the data conductors, thereby improving an aperture ratio of the liquid crystal display.

The data line 171 and the drain electrode 175 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti), for example. Further, the data line 171 and the drain electrode 175 may include a refractory metal such as molybdenum, chromium, tantalum, and titanium or an alloy thereof, and may have a multilayer structure including a refractory metal layer (not illustrated) and a low resistance conductive layer (not illustrated). In an exemplary embodiment, the multilayer structure may include a double layer including a chromium or molybdenum (alloy) lower layer and an aluminum (alloy) upper layer, and a triple layer including a molybdenum (alloy) lower layer, an aluminum (alloy) intermediate layer and a molybdenum (alloy) upper layer. However, the invention is not limited thereto, and the data line 171 and the drain electrode 175 may include other various types of metals or conductors.

A first passivation layer 180p is disposed on the data conductors 171, 173 and 175, the gate insulating layer 140 and an exposed portion of the semiconductor layer 154, and the first passivation layer 180p may include an organic insulation material and an inorganic insulation material, for example.

An organic layer 80 is disposed on the first passivation layer 180p.

According to the exemplary embodiment of the invention, a plurality of color filters may also be disposed on the first passivation layer 180p.

A common electrode 270 is disposed on the organic layer 80. The common electrode 270 may include a transparent conductive material such as indium tin oxide ("ITO") or indium zinc oxide ("IZO"). The common electrode 270 includes a planar shape and may be disposed on an entire surface of the first substrate 110 in a plate shape, and may be provided with an opening 273 defined at an area corresponding to an area of the drain electrode 175.

The common electrodes 270 disposed at adjacent pixels may be connected with each other.

However, according to another exemplary embodiment of the invention, the common electrode 270 may also receive a common voltage from a common voltage applying unit disposed at a neighboring area outside a display area in which a plurality of pixels is disposed.

A second passivation layer 180q is disposed on the common electrode 270. The second passivation layer 180q may include an organic insulating material or an inorganic insulating material.

A pixel electrode 191 is disposed on the second passivation layer 180q. The pixel electrode 191 includes a curved edge which is substantially parallel to the first curved portion and the second curved portion of the data line 171. A plurality of slits 92 is defined in the pixel electrode 191, and the pixel electrode 191 includes a plurality of first branch electrodes 192 defined by the plurality of slits 92.

A first contact hole 185 through which the drain electrode 175 is exposed is defined in the first passivation layer 180p and the second passivation layer 180q. The pixel electrode 191 is physically and electrically connected with the drain electrode 175 through the first contact hole 185 to receive a voltage from the drain electrode 175. The first contact hole 185 is defined at a position corresponding to an opening 273 defined at the common electrode 270.

Although it is not illustrated, an alignment layer is disposed on the pixel electrode 191 and the second passivation layer 180q. In an exemplary embodiment, the alignment layer may be a horizontal alignment layer, and is rubbed in a predetermined direction. However, according to another exemplary embodiment of the invention, the alignment layer may include a light reaction material to be photo-aligned.

The upper display panel 200 according to an exemplary embodiment of the invention will be described below.

A light blocking member 220 is disposed on a second substrate 210. The light blocking member 220 may also be referred to as a black matrix, and effectively prevents a light leakage.

A plurality of color filters 230 is disposed on the second substrate 210. The color filters 230 are mostly provided within an area surrounded by the light blocking member 220, and may elongate in any one direction.

Each color filter 230 may uniquely display one of primary colors, and an exemplary embodiment of the primary colors includes the three primary colors such as red, green and blue, or yellow, cyan and magenta, for example. Although it is not illustrated, the color filter 230 may further include a color filter displaying a combination color of the primary colors, or white, other than the primary colors. The color filters 230 may include an organic material. Each color filter 230 may elongate along the data line 171, and the two color filters 230 adjacent based on the data line 171 serving as a boundary may overlap each other.

As described above, according to another exemplary embodiment of the invention, the color filters 230 may also be disposed on the first passivation layer 180p of the first substrate 110, and in this case, the light blocking member 220 may also be disposed on the first substrate 110.

A second alignment layer (not illustrated) may be applied on an interior surface of the upper display panel 200.

The first alignment layer and the second alignment layer may be horizontal alignment layers.

The liquid crystal layer 3 interposed between the lower display panel 100 and the upper display panel 200 includes liquid crystal molecules (not illustrated), and elongated axes of the liquid crystal molecules are aligned to be horizontal with respect to surfaces of the two display panels 100 and 200 in a state where there is no electric field.

The liquid crystal layer 3 may have a positive dielectric anisotropy, and may also have a negative dielectric anisotropy. The liquid crystal molecules of the liquid crystal layer 3 may be aligned to have a pretilt in a predetermined direction, and the direction of the pretilt of the liquid crystal molecules is variable according to the dielectric anisotropy of the liquid crystal layer 3.

In an exemplary embodiment, the liquid crystal display may further include a back light unit (not illustrated) generating light and providing the generated light to the two display panels 100 and 200 at an outside of the first substrate 110.

The pixel electrode 191 receiving a data voltage and the common electrode 270 receiving a common voltage determine directions of the liquid crystal molecules of the liquid crystal layer 3, and a corresponding image is displayed by generating an electric field on the liquid crystal layer 3.

In the exemplary embodiment described with reference to FIGS. 1 and 2, it is described that the common electrodes 270 and the pixel electrode 191, which are the two electric field generating electrodes, overlap with the insulating layer interposed therebetween, the common electrode 270 is disposed under the insulating layer, and the pixel electrode 191 is disposed on the insulating layer. However, according to another exemplary embodiment of the invention, the pixel electrode 191 may be disposed under the insulating layer, and the common electrode 270 may be disposed on the insulating layer. Further, in the exemplary embodiment described with reference to FIGS. 1 and 2, it is described that the pixel electrode 191 has the plurality of branch electrodes 192, but according to another exemplary embodiment of the invention, the common electrode 270 may also have a plurality of branch electrodes.

Further, in the exemplary embodiment described with reference to FIGS. 1 and 2, it is described that the common electrodes 270 and the pixel electrode 191, which are the two electric field generating electrodes overlapping each other, overlap with the insulating layer interposed therebetween, any one of the two electric field generating electrodes is a plate shape, and the remaining electrode has the branched portion. However, the invention is not limited thereto, and may be applied to other various types of liquid crystal displays having two electric field generating electrodes disposed on a single display panel.

A plurality of pixels of a liquid crystal display according to another exemplary embodiment of the invention will be described below with reference to FIGS. 3 and 4.

Figure 3:
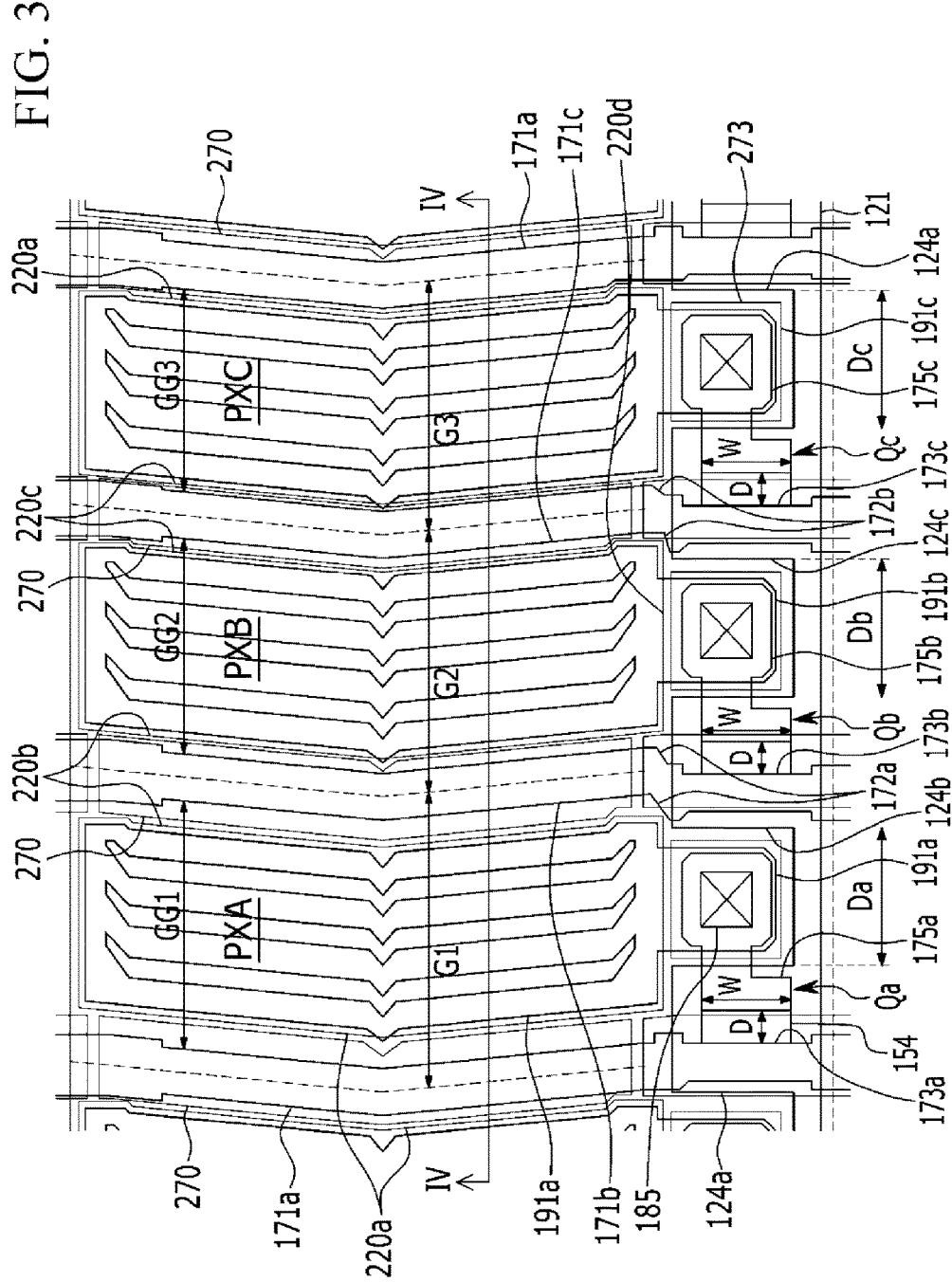
FIG. 3 is a plan view illustrating an exemplary embodiment of a plurality of pixels of a liquid crystal display according to the invention.
Figure 4:
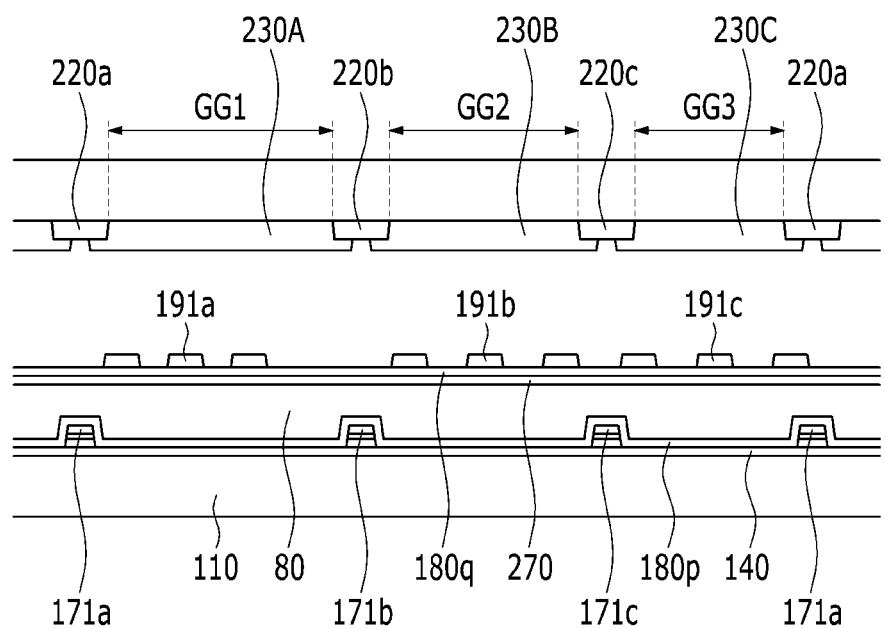
FIG. 4 is a cross-sectional view illustrating the liquid crystal display taken along line IV-IV of FIG. 3.

FIG. 3 is a plan view illustrating the plurality of pixels of the liquid crystal display according to the exemplary embodiment of the invention, and FIG. 4 is a cross-sectional view illustrating the liquid crystal display taken along line IV-IV of FIG. 3.

A structure of each pixel according to the exemplary embodiment shown in FIGS. 3 and 4 is similar to the pixel of the liquid crystal device according to the exemplary embodiment described with reference to FIGS. 1 and 2. Accordingly, a detailed description thereof will be omitted.

Referring to FIGS. 3 and 4, the liquid crystal display according to the exemplary embodiment of the invention includes a first pixel PXA, a second pixel PXB and a third pixel PXC, which are adjacently disposed to each other and display different colors. The first pixel PXA, the second pixel PXB and the third pixel PXC may be sequentially arranged and repeatedly disposed. In an exemplary embodiment, the third pixel PXC and the second pixel PXB may be disposed at both sides of the first pixel PXA, the first pixel PXA and the third pixel PXC may be disposed at both sides of the second pixel PXB, or the second pixel PXB and the first pixel PXA may be disposed at both sides of the third pixel PXC, for example.

The liquid crystal display according to the illustrated exemplary embodiment includes a first data line 171a, a second data line 171b and a third data line 171c, which are sequentially disposed. The first data line 171a, the second data line 171b and the third data line 171c may be sequentially arranged, and repeatedly disposed.

The first pixel PXA includes a first pixel electrode 191a and a first color filter 230A displaying a first color.

The first data line 171a and the second data line 171b are disposed at both sides of the first pixel PXA.

The first pixel electrode 191a of the first pixel PXA receives a data voltage supplied from a first source electrode 173a connected to the first data line 171a from a first drain electrode 175a.

The second pixel PXB includes a second pixel electrode 191b and a second color filter 230B displaying a second color.

The second data line 171b and the third data line 171c are disposed at both sides of the second pixel PXB.

The second pixel electrode 191b of the second pixel PXB receives a data voltage supplied from a second source electrode 173b connected to the second data line 171b from a second drain electrode 175b.

The third pixel PXC includes a third pixel electrode 191c and a third color filter 230C displaying a third color.

The third data line 171c and the first data line 171a are disposed at both sides of the third pixel PXC.

The third pixel electrode 191c of the third pixel PXC receives a data voltage supplied from a third source electrode 173c connected to the third data line 171c from a third drain electrode 175c.

The first data line 171a, the second data line 171b and the third data line 171c have substantially the same width.

A transverse width of the first pixel PXA is a first interval G1 between a vertical center line (indicated by a dotted line in FIG. 3) of the first data line 171a and a vertical center line of the second data line 171b disposed at both sides of the first pixel PXA. Here, the transverse width of the pixel means a width measured in a direction substantially parallel to a direction in which a gate line is extended.

A transverse width of the second pixel PXB is a second interval G2 between a vertical center line of the second data line 171b and a vertical center line of the third data line 171c disposed at both sides of the second pixel PXB. Similarly, a transverse width of the third pixel PXC is a third interval G3 between a vertical center line of the third data line 171c and the vertical center line of the first data line 171a disposed at both sides of the third pixel PXC.

The first interval G1 is different from the second interval G2, the second interval G2 is different from the third interval G3, and the third interval G3 is different from the first interval G1. That is, the transverse widths of the first pixel PXA, the second pixel PXB and the third pixel PXC displaying the different colors may be different from each other.

However, according to another exemplary embodiment of the invention, any one among the first interval G1, the second interval G2 and the third interval G3 may be larger or smaller than the remaining intervals. That is, the transverse width of the pixel of any one of the first pixel PXA, the second pixel PXB and the third pixel PXC displaying different colors may be larger or smaller than the transverse widths of the remaining two pixels.

As described above, the first data line 171a, the second data line 171b and the third data line 171c of the liquid crystal display according to the exemplary embodiment of the invention may have substantially the same width.

As illustrated in FIGS. 3 and 4, the liquid crystal display according to the exemplary embodiment of the invention includes a light blocking member 220 surrounding edges of the first pixel PXA, the second pixel PXB and the third pixel PXC. The light blocking member 220 includes a first light blocking member 220a overlapping the first data line 171a, a second light blocking member 220b overlapping the second data line 171b and a third light blocking member 220c overlapping the third data line 171c. The first light blocking member 220a, the second light blocking member 220b and the third light blocking member 220c are connected with each other by a transverse portion 220d of the light blocking member 220, and the transverse portion 220d of the light blocking member 220 is disposed at an area in which a thin film transistor overlaps a first contact hole 185.

The widths of the first light blocking member 220a, the second light blocking member 220b and the third light blocking member 220c are the same as each other.

However, a fourth interval GG1 between the first light blocking member 220a overlapping the first data line 171a and the second light blocking member 220b overlapping the second data line 171b adjacent to each other is different from a fifth interval GG2 between the second light blocking member 220b overlapping the second data line 171b and the third light blocking member 220c overlapping the third data line 171c adjacent to each other. The fifth interval GG2 between the second light blocking member 220b overlapping the second data line 171b and the third light blocking member 220c overlapping the third data line 171c adjacent to each other is different from a sixth interval GG3 between the third light blocking member 220c overlapping the third data line 171c and the first light blocking member 220a overlapping the first data line 171a adjacent to each other. Further, the sixth interval GG3 between the third light blocking member 220c overlapping the third data line 171c and the first light blocking member 220a overlapping the first data line 171a is different from the fourth interval GG1 between the first light blocking member 220a overlapping the first data line 171a and the second light blocking member 220b overlapping the second data line 171b.

Accordingly, areas of opened areas of the first pixel PXA, the second pixel PXB and the third pixel PXC may be different from each other.

However, according to another exemplary embodiment of the invention, any one of the fourth interval GG1, the fifth interval GG2 and the sixth interval GG3 may be larger or smaller than the remaining intervals. That is, an area of the opened area of any one pixel among the first pixel PXA, the second pixel PXB and the third pixel PXC displaying the different colors may be larger or smaller than the areas of the opened areas of the remaining two pixels.

As described above, in the liquid crystal display according to the exemplary embodiment of the invention, the widths of the sequentially disposed data lines 171a, 171b and 171c are the same as each other, but the intervals between the adjacent data lines 171a, 171b and 171c or the intervals between the adjacent light blocking members 220a, 220b and 220c are provided to be different from each other, so that the areas of the opened areas of the first pixel PXA, the second pixel PXB and the third pixel PXC may be provided to be different from each other.

The areas of the opened areas of the first pixel PXA, the second pixel PXB and the third pixel PXC may be different by approximately 20 percent (%) based on the area of the opened area of any one pixel. More particularly, compared to the area of the opened area of the first pixel PXA, the area of the opened area of the second pixel PXB may be larger or smaller than the area of the opened area of the first pixel PXA within approximately 20%.

As described above, the area of the opened area of at least one of the first pixel PXA, the second pixel PXB and the third pixel PXC displaying the different colors is provided to be different from the areas of the opened areas of the remaining pixels, so that when the same common voltage and data voltage are applied to the respective pixels PXA, PXB and PXC displaying the different colors, it is possible to adjust brightness represented by the respective pixels PXA, PXB and PXC to be equal, thereby effectively improving a color reproduction property of the liquid crystal display.

Referring to FIG. 3, the areas of the first pixel electrode 191a of the first pixel PXA, the second pixel electrode 191b of the second pixel PXB and the third pixel electrode 191c of the third pixel PXC may be the same as each other.

As described above, the areas of the pixel electrodes 191a, 191b and 191c of the plurality of pixels PXA, PXB and PXC displaying the different colors are provided to be the same as each other, so that the overlapping areas of the common electrode 270 with the pixel electrodes 191a, 191b and 191c may be provided to be the same as each other. Accordingly, sizes of storage capacitances of the plurality of pixels PXA, PXB and PXC displaying the different colors are the same. When the sizes of the storage capacitances between the plurality of pixels PXA, PXB and PXC displaying the different colors are different, sizes of kickback voltages may be different, and thus display quality deterioration such as a flicker or an afterimage, may occur. However, according to the exemplary embodiment of the invention, the areas of the opened areas of the plurality of pixels PXA, PXB and PXC displaying the different colors are provided to be different from each other, and the sizes of the storage capacitances of the plurality of pixels PXA, PXB and PXC displaying the different colors are provided to be the same as each other, so that it is possible to effectively prevent a difference of the kickback voltages, thereby effectively preventing deterioration of the display quality.

Further, the positions and the shapes of the respective thin film transistors Qa, Qb and Qc connected to the first pixel electrode 191a of the first pixel PXA, the second pixel electrode 191b of the second pixel PXB and the third pixel electrode 191c of the third pixel PXC, respectively, may be substantially the same as each other.

Specifically, the shapes of the first gate electrode 124a of the first pixel PXA, the second gate electrode 124b of the second pixel PXB and the third gate electrode 124c of the third pixel PXC are the same as each other, and a seventh interval Da between the first gate electrode 124a of the first pixel PXA and the second gate electrode 124b of the second pixel PXB, an eighth interval Db between the second gate electrode 124b of the second pixel PXB and the third gate electrode 124c of the third pixel PXC and a ninth interval Dc between the third gate electrode 124c of the third pixel PXC and the first gate electrode 124a of the first pixel PXA are substantially the same as each other. Further, channel lengths D and channel widths W of a first thin film transistor Qa connected to the first pixel electrode 191a of the first pixel PXA, a second thin film transistor Qb connected to the second pixel electrode 191b of the second pixel PXB and a third thin film transistor Qc connected to the third pixel electrode 191c of the third pixel PXA are the same as each other.

When the shapes of the respective gate electrodes 124a, 124b and 124c or the seventh interval Da, the eighth interval Db and the ninth interval Dc between the respective gate electrodes 124a, 124b and 124c are different from each other, times for charging the respective gate electrodes 124a, 124b and 124c with a gate-on voltage may be different from each other. When the times for charging the respective gate electrodes 124a, 124b and 124c with the gate-on voltage are different from each other, times for charging the respective pixel electrodes 191a, 191b and 191c with the data voltage are different, which leads display quality deterioration such as a brightness difference. Further, when the channel lengths D and the channel widths W of the thin film transistors of the respective pixels are different, even though the same data voltage is applied, the sizes of the data voltages charged in the respective pixel electrodes 191a, 191b and 191c become different from each other, and the sizes of the kickback voltages become different. It causes display quality deterioration such as a brightness difference. However, according to the exemplary embodiment of the invention, the shapes and the intervals of the gate electrodes 124a, 124b and 124c of the thin film transistors Qa, Qb and Qc of the plurality of pixels PXA, PXB and PXC displaying the different colors are provided to be substantially the same as each other, and the channel lengths D and the channel widths W of the thin film transistors Qa, Qb and Qc are provided to be substantially the same as each other while the areas of the opened areas of the plurality of pixels PXA, PXB and PXC displaying the different colors are provided to be different from each other, thereby effectively preventing display quality deterioration such as a brightness difference.

Referring to FIG. 3, the first source electrode 173a of the first pixel PXA is extended substantially parallel to the first data line 171a. However, the second source electrode 173b of the second pixel PXB is not parallel to the second data line 171b, and the second data line 171b and the second source electrode 173b are connected with each other through a first oblique portion 172a. Further, the third source electrode 173c of the third pixel PXC is not parallel to the third data line 171c, and the third data line 171c and the third source electrode 173c may be connected with each other through a second oblique portion 172b. Lengths of the first oblique portion 172a and the second oblique portion 172b may be different from each other. As illustrated, the respective source electrodes 173a, 173b and 173c are extended at portions overlapping edges of the respective gate electrodes 124a, 124b and 124c. Through steps of the respective gate electrodes 124a, 124b and 124c, short circuits of the respective source electrodes 173a, 173b and 173c disposed on the respective gate electrodes 124a, 124b and 124c may be effectively prevented.

As described above, according to the exemplary embodiment of the invent, the overlapping areas of the pixel electrodes and the common electrodes of the respective pixels are provided to be the same as each other while effectively improving a color reproduction property of the liquid crystal display to maintain the same storage capacitance, the shapes and the intervals of the gate electrodes 124a, 124b and 124c of the thin film transistors Qa, Qb and Qc, and the channel lengths D and the channel widths W of the thin film transistors Qa, Qb and Qc may be provided to be different from each other, thereby effectively preventing display quality deterioration.

Figure 5:
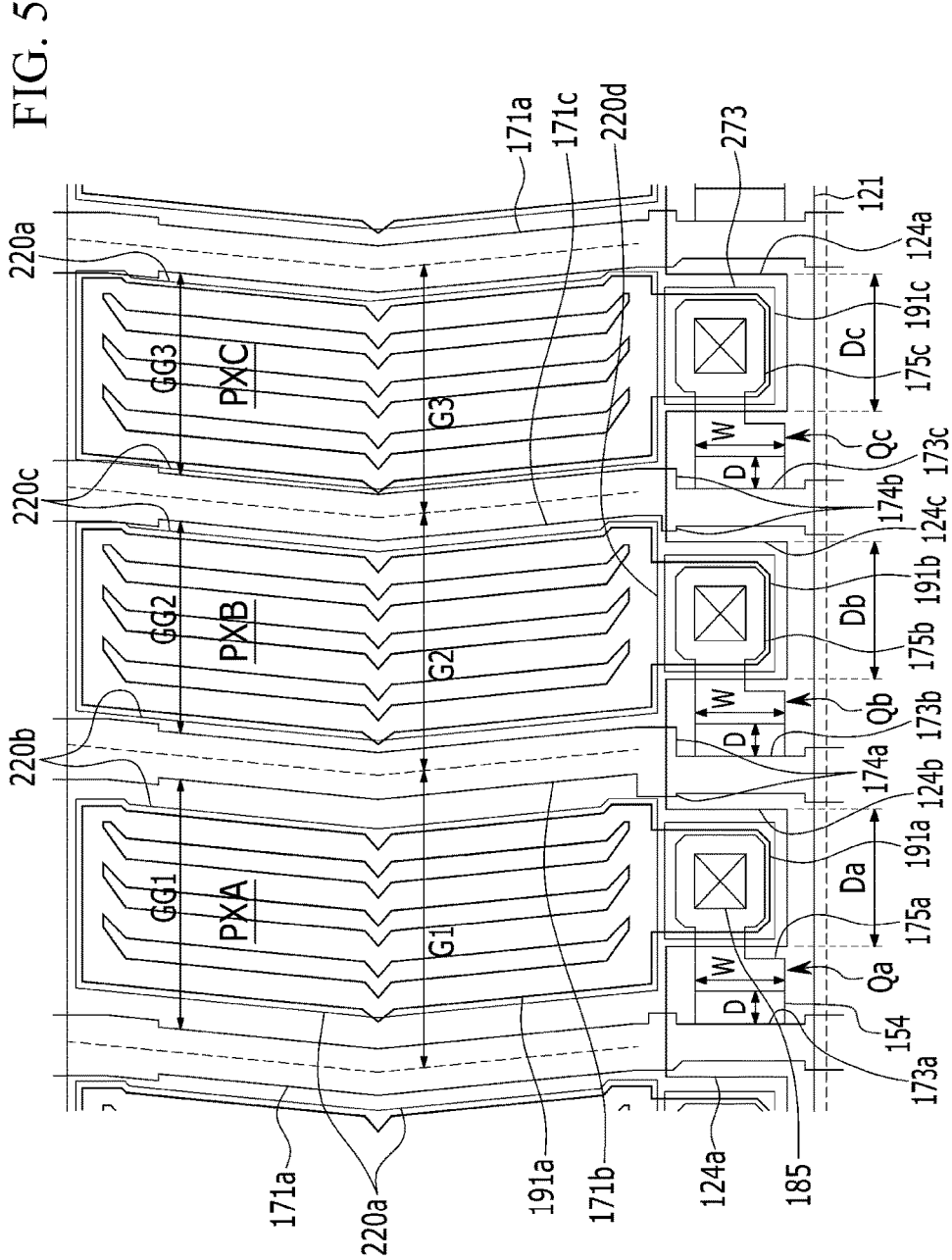
FIG. 5 is a plan view illustrating another exemplary embodiment of a plurality of pixels of a liquid crystal display according to the invention.

A liquid crystal display according to another embodiment of the invention will be described below with reference to FIG. 5. FIG. 5 is a plan view illustrating a plurality of pixels of a liquid crystal display according to another exemplary embodiment of the invention.

Referring to FIG. 5, the liquid crystal display according to the exemplary embodiment shown in FIG. 5 is similar to the liquid crystal display according to the exemplary embodiment described with reference to FIGS. 3 and 4. A detailed structure thereof will be omitted.

As illustrated in FIG. 5, the liquid crystal display according to the exemplary embodiment of the invention includes a first pixel PXA, a second pixel PXB and a third pixel PXC, which are adjacently disposed to each other and display different colors. The first pixel PXA, the second pixel PXB and the third pixel PXC are sequentially arranged, and repeatedly disposed.

The liquid crystal display according to the illustrated exemplary embodiment includes a first data line 171a, a second data line 171b and a third data line 171c, which are sequentially disposed. The first data line 171a, the second data line 171b and the third data line 171c may be sequentially arranged, and repeatedly disposed.

A transverse width of the first pixel PXA is a first interval G1 between a vertical center line of the first data line 171a and a vertical center line of the second data line 171b disposed at both sides of the first pixel PXA. A transverse width of the second pixel PXB is a second interval G2 between a vertical center line of the second data line 171b and a vertical center line of the third data line 171c disposed at both sides of the second pixel PXB. Similarly, a transverse width of the third pixel PXC is a third interval G3 between a vertical center line of the third data line 171c and the vertical center line of the first data line 171a disposed at both sides of the third pixel PXC.

The first interval G1 is different from the second interval G2, the second interval G2 is different from the third interval G3, and the third interval G3 is different from the first interval G1. That is, the transverse widths of the first pixel PXA, the second pixel PXB and the third pixel PXC displaying the different colors may be different from each other.

However, according to another exemplary embodiment of the invention, any one among the first interval G1, the second interval G2 and the third interval G3 may also be larger or smaller than the remaining intervals. That is, the transverse width of the pixel of any one of the first pixel PXA, the second pixel PXB and the third pixel PXC displaying different colors may be larger or smaller than the transverse widths of the remaining two pixels.

The first data line 171a, the second data line 171b and the third data line 171c have substantially the same width.

The liquid crystal display according to the exemplary embodiment of the invention includes a light blocking member 220 surrounding edges of the first pixel PXA, the second pixel PXB and the third pixel PXC. The light blocking member 220 includes a first light blocking member 220a overlapping the first data line 171a, a second light blocking member 220b overlapping the second data line 171b and a third light blocking member 220c overlapping the third data line 171c. The first light blocking member 220a, the second light blocking member 220b and the third light blocking member 220c are connected with each other by a transverse portion 220d of the light blocking member 220, and the transverse portion 220d of the light blocking member 220 is disposed at an area in which a thin film transistor overlaps a first contact hole 185.

The widths of the first light blocking member 220a, the second light blocking member 220b and the third light blocking member 220c are the same as each other. However, a fourth interval GG1 between the first light blocking member 220a overlapping the first data line 171a and the second light blocking member 220b overlapping the second data line 171b adjacent to each other is different from a fifth interval GG2 between the second light blocking member 220b overlapping the second data line 171b and the third light blocking member 220c overlapping the third data line 171c adjacent to each other. The fifth interval GG2 between the second light blocking member 220b overlapping the second data line 171b and the third light blocking member 220c overlapping the third data line 171c adjacent to each other is different from a sixth interval GG3 between the third light blocking member 220c overlapping the third data line 171c and the first light blocking member 220a overlapping the first data line 171a adjacent to each other. Further, the sixth interval GG3 between the third light blocking member 220c overlapping the third data line 171c and the first light blocking member 220a overlapping the first data line 171a is different from the fourth interval GG1 between the first light blocking member 220a overlapping the first data line 171a and the second light blocking member 220b overlapping the second data line 171b.

Accordingly, areas of opened areas of the first pixel PXA, the second pixel PXB and the third pixel PXC may be different from each other.

However, according to another exemplary embodiment of the invention, any one of the fourth interval GG1, the fifth interval GG2 and the sixth interval GG3 may be larger or smaller than the remaining intervals. That is, an area of the opened area of any one pixel among the first pixel PXA, the second pixel PXB and the third pixel PXC displaying the different colors may be larger or smaller than the areas of the opened areas of the remaining two pixels.

As described above, in the liquid crystal display according to the exemplary embodiment of the invention, the widths of the sequentially disposed data lines 171a, 171b and 171c are the same as each other, but the intervals between the adjacent data lines 171a, 171b and 171c or the intervals between the adjacent light blocking members 220a, 220b and 220c are provided to be different from each other, so that the areas of the opened areas of the first pixel PXA, the second pixel PXB and the third pixel PXC may be provided to be different from each other.

The areas of the opened areas of the first pixel PXA, the second pixel PXB and the third pixel PXC may be different by approximately 20% based on the area of the opened area of any one pixel. More specifically, compared to the area of the opened area of the first pixel PXA, the area of the opened area of the second pixel PXB may be larger or smaller than the area of the opened area of the first pixel PXA within approximately 20%.

As described above, the area of the opened area of at least one of the first pixel PXA, the second pixel PXB and the third pixel PXC displaying the different colors is provided to be different from the areas of the opened areas of the remaining pixels, so that when the same common voltage and data voltage are applied to the respective pixels PXA, PXB and PXC displaying the different colors, it is possible to adjust brightness represented by the respective pixels PXA, PXB and PXC to be equal, thereby effectively improving a color reproduction property of the liquid crystal display.

Referring to FIG. 5, the areas of the first pixel electrode 191a of the first pixel PXA, the second pixel electrode 191b of the second pixel PXB and the third pixel electrode 191c of the third pixel PXC are the same as each other.

As described above, the areas of the pixel electrodes 191a, 191b and 191c of the plurality of pixels PXA, PXB and PXC displaying the different colors are provided to be the same as each other, so that the overlapping areas of the common electrode 270 with the pixel electrodes 191a, 191b and 191c may be provided to be the same as each other. Accordingly, the areas of the opened areas of the plurality of pixels PXA, PXB and PXC displaying the different colors are provided to be different from each other, and the sizes of the storage capacitances of the plurality of pixels PXA, PXB and PXC displaying the different colors are provided to be the same as each other, so that it is possible to effectively prevent a difference of the kickback voltages, thereby effectively preventing deterioration of the display quality.

Further, the positions and the shapes of the respective thin film transistors Qa, Qb and Qc connected to the first pixel electrode 191a of the first pixel PXA, the second pixel electrode 191b of the second pixel PXB and the third pixel electrode 191c of the third pixel PXC, respectively, may be substantially the same as each other.

Specifically, the shapes of the first gate electrode 124a of the first pixel PXA, the second gate electrode 124b of the second pixel PXB and the third gate electrode 124c of the third pixel PXC are the same as each other, and a seventh interval Da between the first gate electrode 124a of the first pixel PXA and the second gate electrode 124b of the second pixel PXB, an eighth interval Db between the second gate electrode 124b of the second pixel PXB and the third gate electrode 124c of the third pixel PXC and a ninth interval Dc between the third gate electrode 124c of the third pixel PXC and the first gate electrode 124a of the first pixel PXA are substantially the same as each other. Further, the channel lengths D and the channel widths W of the respective thin film transistors Qa, Qb and Qc connected to the first pixel electrode 191a of the first pixel PXA, the second pixel electrode 191b of the second pixel PXB and the third pixel electrode 191c of the third pixel PXC, respectively, may be the same as each other. Accordingly, in the liquid crystal display according to the illustrated exemplary embodiment, the shapes and the intervals of the gate electrodes 124a, 124b and 124c of the thin film transistors Qa, Qb and Qc of the plurality of pixels PXA, PXB and PXC displaying the different colors are provided to be substantially the same as each other, and the channel lengths D and the channel widths W of the thin film transistors Qa, Qb and Qc are provided to be substantially the same as each other while the areas of the opened areas of the plurality of pixels PXA, PXB and PXC displaying the different colors are provided to be different from each other, thereby effectively preventing display quality deterioration such as a brightness difference.

Referring to FIG. 5, the first source electrode 173a of the first pixel PXA is extended substantially parallel to the first data line 171a. However, a second source electrode 173b of the second pixel PXB is not parallel to the second data line 171b, and includes a first extended portion 174a overlapping an edge of the second gate electrode 124b. The first extended portion 174a of the second source electrode 173b is connected with the second data line 171b. Similarly, a third source electrode 173c of the third pixel PXC is not parallel to the third data line 171c, and the third source electrode 173c includes a second extended portion 174b overlapping an edge of the third gate electrode 124c. The second extended portion 174b of the third source electrode 173c is connected with the third data line 171c.

As described above, contrary to the liquid crystal display according to the exemplary embodiment illustrated in FIG. 3, the liquid crystal display according to the illustrated exemplary embodiment does not include the first oblique portion 172a connecting the second data line 171b and the second source electrode 173b of the second pixel PXB with each other and the second oblique portion 172b connecting the third data line 171c and the third source electrode 173 of the third pixel PXC with each other. In order to effectively prevent a disconnection of the second source electrode 173b and the third source electrode 173c, the second data line 171b and the third data line 171c are extended up to the first extended portion 174a and the second extended portion 174b of the second source electrode 173b and the third source electrode 173c disposed to overlap the edges of the second gate electrode 124b and the third gate electrode 124c to be connected with the second source electrode 173b and the third source electrode 173c.

According to the illustrated exemplary embodiment, the storage capacitances of the respective pixels are maintained to be the same as each other by providing the overlapping areas of the pixel electrodes and the common electrodes of the respective pixels to be the equal to each other, and the shapes and the intervals of the gate electrodes 124a, 124b and 124c of the thin film transistors Qa, Qb and Qc, and the channel lengths D and the channel widths W of the thin film transistor are provided to be the same as each other while improving a color reproduction property of the liquid crystal display, thereby effectively preventing display quality deterioration.

Many characteristics of the liquid crystal displays according to the exemplary embodiments previously described with reference to FIGS. 1 and 2, and FIGS. 3 and 4 are applicable to the liquid crystal display according to the illustrated exemplary embodiment with reference to FIG. 5.

Figure 6:
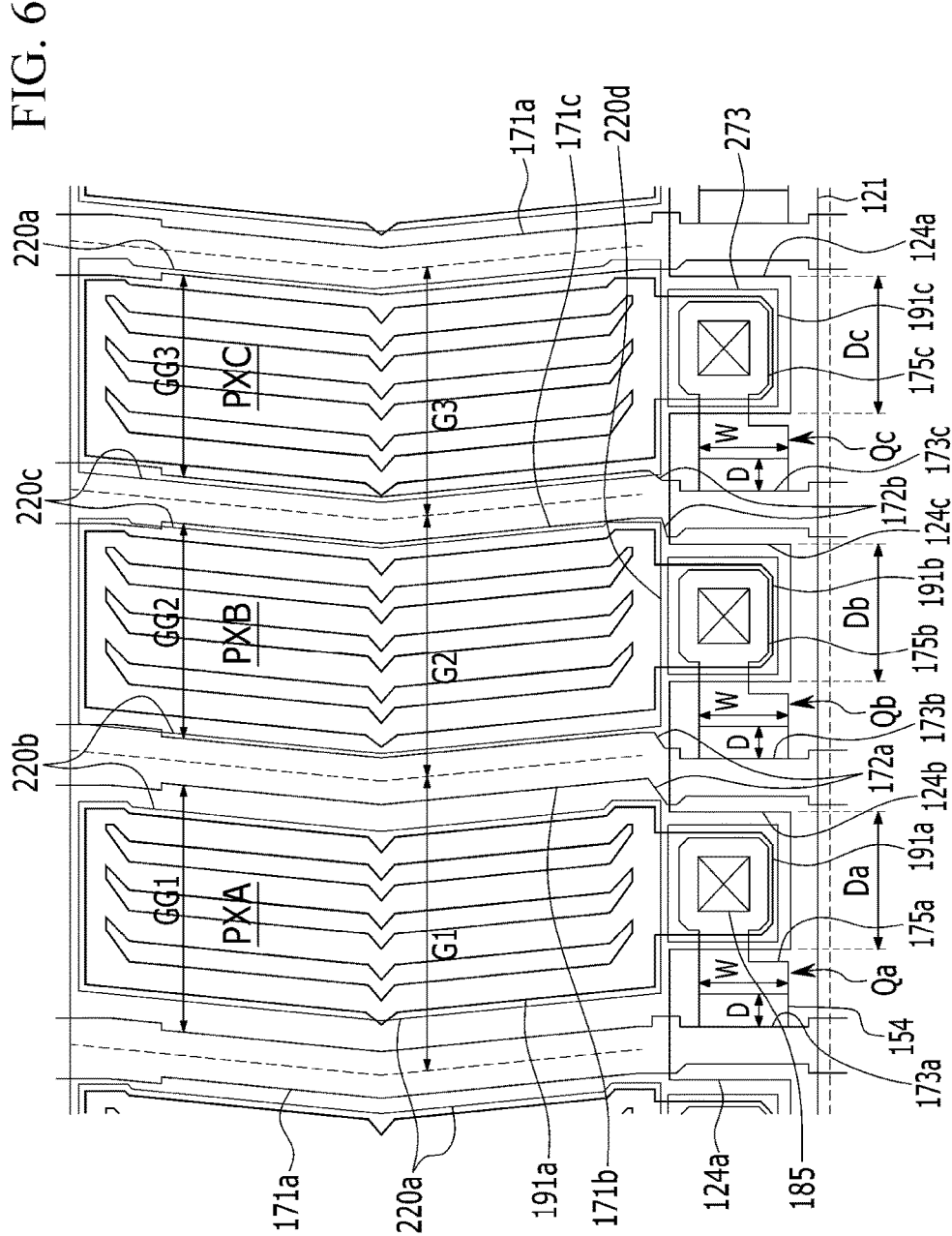
FIG. 6 is a plan view illustrating another exemplary embodiment of a plurality of pixels of a liquid crystal display according to the invention.

Next, a liquid crystal display according to another exemplary embodiment of the invention will be described below with reference to FIG. 6. FIG. 6 is a plan view illustrating a plurality of pixels of a liquid crystal display according to another exemplary embodiment of the invention.

Referring to FIG. 6, the liquid crystal display according to the exemplary embodiment shown in FIG. 6 is similar to the liquid crystal display according to the exemplary embodiment described with reference to FIGS. 3 and 4. A detailed description thereof will be omitted.

As illustrated in FIG. 6, the liquid crystal display according to the exemplary embodiment of the invention includes a first pixel PXA, a second pixel PXB and a third pixel PXC, which are adjacently disposed to each other and display different colors. The first pixel PXA, the second pixel PXB and the third pixel PXC may be sequentially arranged and repeatedly disposed.

The liquid crystal display according to the illustrated exemplary embodiment includes a first data line 171a, a second data line 171b and a third data line 171c, which are sequentially disposed. The first data line 171a, the second data line 171b and the third data line 171c may be sequentially arranged, and repeatedly disposed.

A transverse width of the first pixel PXA is a first interval G1 between a vertical center line of the first data line 171a and a vertical center line of the second data line 171b disposed at both sides of the first pixel PXA. A transverse width of the second pixel PXB is a second interval G2 between a vertical center line of the second data line 171b and a vertical center line of the third data line 171c disposed at both sides of the second pixel PXB. Similarly, a transverse width of the third pixel PXC is a third interval G3 between a vertical center line of the third data line 171c and the vertical center line of the first data line 171a disposed at both sides of the third pixel PXC.

The first interval G1 is different from the second interval G2, the second interval G2 is different from the third interval G3, and the third interval G3 is different from the first interval G1. That is, the transverse widths of the first pixel PXA, the second pixel PXB and the third pixel PXC displaying the different colors may be different from each other.

However, according to another exemplary embodiment of the invention, any one among the first interval G1, the second interval G2 and the third interval G3 may also be larger or smaller than the remaining intervals. That is, the transverse width of the pixel of any one of the first pixel PXA, the second pixel PXB and the third pixel PXC displaying different colors may be larger or smaller than the transverse widths of the remaining two pixels.

The first data line 171a, the second data line 171b and the third data line 171c have substantially the same width.

The liquid crystal display according to the exemplary embodiment of the invention includes a light blocking member 220 surrounding edges of the first pixel PXA, the second pixel PXB and the third pixel PXC. The light blocking member 220 includes a first light blocking member 220a overlapping the first data line 171a, a second light blocking member 220b overlapping the second data line 171b and a third light blocking member 220c overlapping the third data line 171c. The first light blocking member 220a, the second light blocking member 220b and the third light blocking member 220c are connected with each other by a transverse portion 220d of the light blocking member 220, and the transverse portion 220d of the light blocking member 220 is disposed at an area in which a thin film transistor overlaps a first contact hole 185.

The widths of the first light blocking member 220a, the second light blocking member 220b and the third light blocking member 220c are different from each other. More specifically, the width of the first light blocking member 220a is larger than the width of the second light blocking member 220b, and the width of the second light blocking member 220b is larger than the width of the third light blocking member 220c. However, according to another exemplary embodiment of the invention, a width of any one of the first light blocking member 220a, the second light blocking member 220b and the third light blocking member 220c may be larger or smaller than the widths of the remaining light blocking members. That is, the width of any one of the first light blocking member 220a, the second light blocking member 220b and the third light blocking member 220c may be larger or smaller than the widths of the remaining light blocking members.

A fourth interval GG1 between the first light blocking member 220a overlapping the first data line 171a and the second light blocking member 220b overlapping the second data line 171b adjacent to each other is different from a fifth interval GG2 between the second light blocking member 220b overlapping the second data line 171b and the third light blocking member 220c overlapping the third data line 171c adjacent to each other. The fifth interval GG2 between the second light blocking member 220b overlapping the second data line 171b and the third light blocking member 220c overlapping the third data line 171c adjacent to each other is different from a sixth interval GG3 between the third light blocking member 220c overlapping the third data line 171c and the first light blocking member 220a overlapping the first data line 171a adjacent to each other. Further, the sixth interval GG3 between the third light blocking member 220c overlapping the third data line 171c and the first light blocking member 220a overlapping the first data line 171a is different from the fourth interval GG1 between the first light blocking member 220a overlapping the first data line 171a and the second light blocking member 220b overlapping the second data line 171b.

Accordingly, areas of the opened areas of the first pixel PXA, the second pixel PXB and the third pixel PXC may be different from each other. However, according to another exemplary embodiment of the invention, any one of the fourth interval GG1, the fifth interval GG2 and the sixth interval GG3 may be larger or smaller than the remaining intervals. That is, an area of the opened area of any one pixel among the first pixel PXA, the second pixel PXB and the third pixel PXC displaying the different colors may be larger or smaller than the areas of the opened areas of the remaining two pixels.

As described above, in the liquid crystal display according to the exemplary embodiment of the invention, the widths of the sequentially disposed data lines 171a, 171b and 171c are the same as each other, but the intervals between the adjacent data lines 171a, 171b and 171c or the intervals between the adjacent light blocking members 220a, 220b and 220c are provided to be different from each other, so that the areas of the opened areas of the first pixel PXA, the second pixel PXB and the third pixel PXC may be provided to be different from each other.

The areas of the opened areas of the first pixels PXA, the second pixel PXB and the third pixel PXC may be different by approximately 20% based on the area of the opened area of any one pixel. More specifically, compared to the area of the opened area of the first pixel PXA, the area of the opened area of the second pixel PXB may be larger or smaller than the area of the opened area of the first pixel PXA within approximately 20%.

As described above, the area of the opened area of at least one of the first pixel PXA, the second pixel PXB and the third pixel PXC displaying the different colors is provided to be different from the areas of the opened areas of the remaining pixels, so that when the same common voltage and data voltage are applied to the respective pixels PXA, PXB and PXC displaying the different colors, it is possible to adjust brightness represented by the respective pixels PXA, PXB and PXC to be equal, thereby effectively improving a color reproduction property of the liquid crystal display.

Referring to FIG. 6, the areas of the first pixel electrode 191a of the first pixel PXA, the second pixel electrode 191b of the second pixel PXB and the third pixel electrode 191c of the third pixel PXC are the same as each other.

As described above, the areas of the pixel electrodes 191a, 191b and 191c of the plurality of pixels PXA, PXB and PXC displaying the different colors are provided to be the same as each other, so that the overlapping areas of the common electrode 270 with the pixel electrodes 191a, 191b and 191c may be provided to be the same as each other. Accordingly, the areas of the opened areas of the plurality of pixels PXA, PXB and PXC displaying the different colors are provided to be different from each other, and the sizes of the storage capacitances of the plurality of pixels PXA, PXB and PXC displaying the different colors are provided to be the same as each other, so that it is possible to effectively prevent a difference of the kickback voltages, thereby effectively preventing deterioration of the display quality.

Further, the positions and the shapes of the respective thin film transistors Qa, Qb and Qc connected to the first pixel electrode 191*a* of the first pixel PXA, the second pixel electrode 191*b* of the second pixel PXB and the third pixel electrode 191*c* of the third pixel PXC, respectively, may be substantially the same as each other.

Specifically, the shapes of the first gate electrode 124*a* of the first pixel PXA, the second gate electrode 124*b* of the second pixel PXB and the third gate electrode 124*c* of the third pixel PXC are the same as each other, and a seventh interval Da between the first gate electrode 124*a* of the first pixel PXA and the second gate electrode 124*b* of the second pixel PXB, an eighth interval Db between the second gate electrode 124*b* of the second pixel PXB and the third gate electrode 124*c* of the third pixel PXC and a ninth interval Dc between the third gate electrode 124*c* of the third pixel PXC and the first gate electrode 124*a* of the first pixel PXA are substantially the same as each other. Further, the channel lengths D and the channel widths W of the respective thin film transistors Qa, Qb and Qc connected to the first pixel electrode 191*a* of the first pixel PXA, the second pixel electrode 191*b* of the second pixel PXB and the third pixel electrode 191*c* of the third pixel PXC, respectively, may be the same as each other. Accordingly, in the liquid crystal display according to the illustrated exemplary embodiment, the shapes and the intervals of the gate electrodes 124*a*, 124*b* and 124*c* of the thin film transistors Qa, Qb and Qc of the plurality of pixels PXA, PXB and PXC displaying the different colors are provided to be substantially the same as each other, and the channel lengths D and the channel widths W of the thin film transistors Qa, Qb and Qc are provided to be substantially the same as each other while the areas of the opened areas of the plurality of pixels PXA, PXB and PXC displaying the different colors are provided to be different from each other, thereby effectively preventing display quality deterioration such as a brightness difference.

Referring to FIG. 6, the first source electrode 173*a* of the first pixel PXA is extended substantially parallel to the first data line 171*a*. However, a second source electrode 173*b* of the second pixel PXB is not parallel to the second data line 171*b*, and the second data line 171*b* and the second source electrode 173*b* are connected with each other through a first oblique portion 172*a*. Further, a third source electrode 173*c* of the third pixel PXC is not parallel to the third data line 171*c*, and the third data line 171*c* and the third source electrode 173*c* are connected with each other through a second oblique portion 172*b*. Lengths of the first oblique portion 172*a* and the second oblique portion 172*b* may be different from each other. However, a liquid crystal display according to another exemplary embodiment does not include the first oblique portion 172*a* connecting the second data line 171*b* and the second source electrode 173*b* of the second pixel PXB with each other and the second oblique portion 172*b* connecting the third data line 171*c* and the third source electrode 173 of the third pixel PXC with each other. Further, similar to the display according to the exemplary embodiment illustrated in FIG. 5, in order to effectively prevent a disconnection of the second source electrode 173*b* and the third source electrode 173*c*, the second data line 171*b* and the third data line 171*c* are extended up to the first extended portion 174*a* and the second extended portion 174*b* of the second source electrode 173*b* and the third source electrode 173*c* disposed to overlap the edges of the second gate electrode 124*b* and the third gate electrode 124*c* to be connected with the second source electrode 173*b* and the third source electrode 173*c*.

According to the illustrated exemplary embodiment, the storage capacitances of the respective pixels are maintained to be the same as each other by providing the overlapping areas of the pixel electrodes and the common electrodes of the respective pixels to be the equal to each other, and the shapes and the intervals of the gate electrodes 124*a*, 124*b* and 124*c* of the thin film transistors Qa, Qb and Qc, and the channel lengths D and the channel widths W of the thin film transistor are provided to be the same as each other while improving a color reproduction property of the liquid crystal display, thereby effectively preventing display quality deterioration.

Many characteristics of the liquid crystal displays according to the exemplary embodiments previously described with reference to FIGS. 1 and 2, FIGS. 3 and 4 and FIG. 5 are applicable to the liquid crystal display according to the illustrated exemplary embodiment with reference to FIG. 6.

Figure 7:
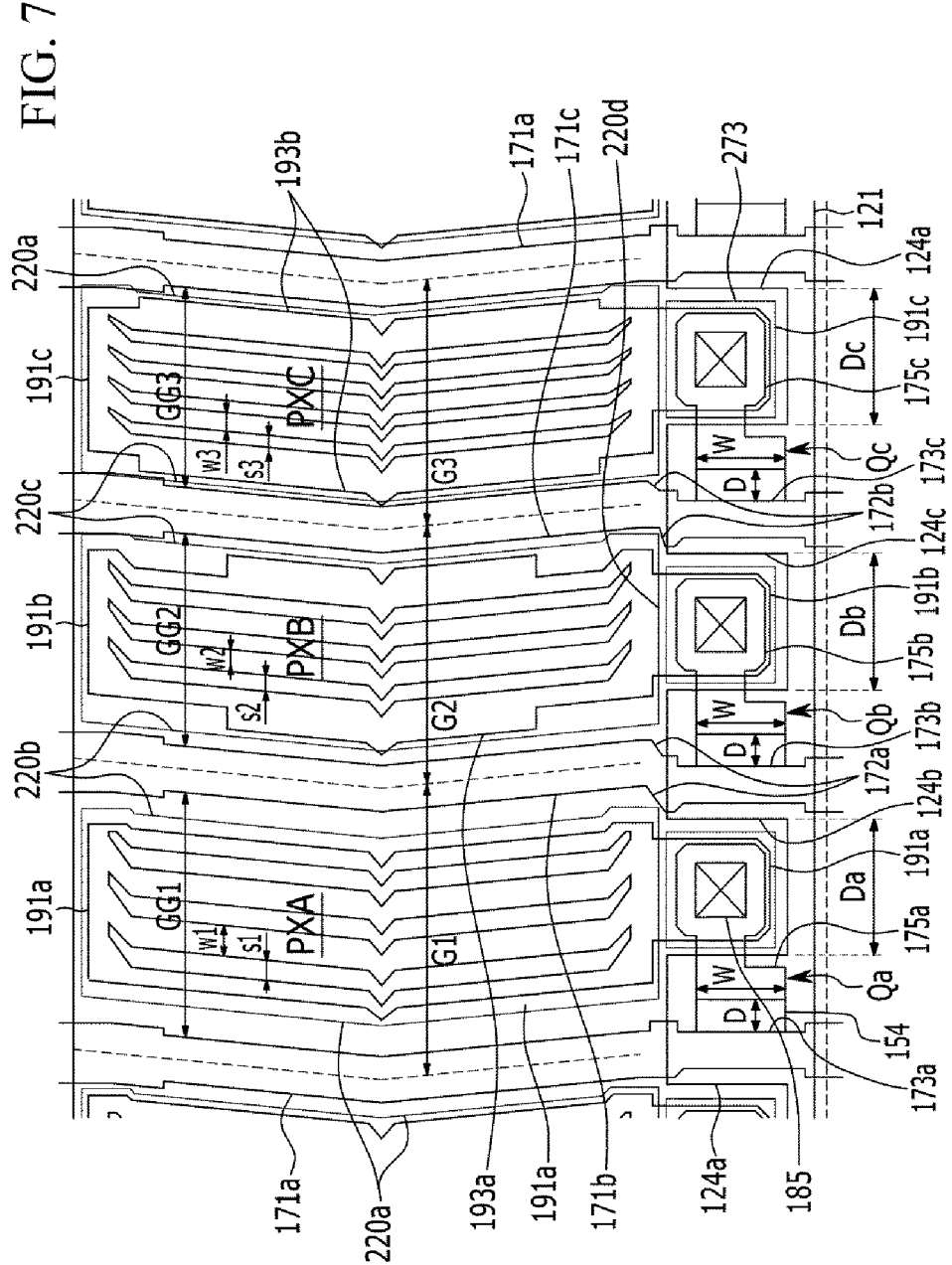
FIG. 7 is a plan view illustrating another exemplary embodiment of a plurality of pixels of a liquid crystal display according to the invention.

Next, a liquid crystal display according to another exemplary embodiment of the invention will be described below with reference to FIG. 7. FIG. 7 is a plan view illustrating a plurality of pixels of a liquid crystal display according to another exemplary embodiment of the invention.

Referring to FIG. 7, the liquid crystal display according to the exemplary embodiment shown in FIG. 7 is similar to the liquid crystal display according to the exemplary embodiment described with reference to FIGS. 3 and 4. A detailed structure thereof will be omitted.

As illustrated in FIG. 7, the liquid crystal display according to the exemplary embodiment of the invention includes a first pixel PXA, a second pixel PXB and a third pixel PXC, which are adjacently disposed to each other and display different colors. The first pixel PXA, the second pixel PXB and the third pixel PXC may be sequentially arranged and repeatedly disposed.

The liquid crystal display according to the illustrated exemplary embodiment includes a first data line 171*a*, a second data line 171*b* and a third data line 171*c*, which are sequentially disposed. The first data line 171*a*, the second data line 171*b* and the third data line 171*c* may be sequentially arranged, and repeatedly disposed.

A transverse width of the first pixel PXA is a first interval G1 between a vertical center line of the first data line 171*a* and a vertical center line of the second data line 171*b* disposed at both sides of the first pixel PXA. A transverse width of the second pixel PXB is a second interval G2 between a vertical center line of the second data line 171*b* and a vertical center line of the third data line 171*c* disposed at both sides of the second pixel PXB. Similarly, a transverse width of the third pixel PXC is a third interval G3 between a vertical center line of the third data line 171*c* and the vertical center line of the first data line 171*a* disposed at both sides of the third pixel PXC.

The first interval G1 is different from the second interval G2, the second interval G2 is different from the third interval G3, and the third interval G3 is different from the first interval G1. That is, the transverse widths of the first pixel PXA, the second pixel PXB and the third pixel PXC displaying the different colors may be different from each other.

However, according to another exemplary embodiment of the invention, any one among the first interval G1, the second interval G2 and the third interval G3 may also be larger or smaller than the remaining intervals. That is, the transverse width of the pixel of any one of the first pixel PXA, the second pixel PXB and the third pixel PXC displaying different colors may be larger or smaller than the transverse widths of the remaining two pixels.

The first data line 171a, the second data line 171b and the third data line 171c have substantially the same width.

The liquid crystal display according to the exemplary embodiment of the invention includes a light blocking member 220 surrounding edges of the first pixel PXA, the second pixel PXB and the third pixel PXC. The light blocking member 220 includes a first light blocking member 220a overlapping the first data line 171a, a second light blocking member 220b overlapping the second data line 171b and a third light blocking member 220c overlapping the third data line 171c. The first light blocking member 220a, the second light blocking member 220b and the third light blocking member 220c are connected with each other by a transverse portion 220d of the light blocking member 220, and the transverse portion 220d of the light blocking member 220 is disposed at an area in which a thin film transistor overlaps a first contact hole 185.

The widths of the first light blocking member 220a, the second light blocking member 220b and the third light blocking member 220c are the same as each other. However, according to another exemplary embodiment of the invention, the widths of the first light blocking member 220a, the second light blocking member 220b and the third light blocking member 220c may be different from each other.

A fourth interval GG1 between the first light blocking member 220a overlapping the first data line 171a and the second light blocking member 220b overlapping the second data line 171b adjacent to each other is different from a fifth interval GG2 between the second light blocking member 220b overlapping the second data line 171b and the third light blocking member 220c overlapping the third data line 171c adjacent to each other. The fifth interval GG2 between the second light blocking member 220b overlapping the second data line 171b and the third light blocking member 220c overlapping the third data line 171c adjacent to each other is different from a sixth interval GG3 between the third light blocking member 220c overlapping the third data line 171c and the first light blocking member 220a overlapping the first data line 171a adjacent to each other. Further, the sixth interval GG3 between the third light blocking member 220c overlapping the third data line 171c and the first light blocking member 220a overlapping the first data line 171a is different from the fourth interval GG1 between the first light blocking member 220a overlapping the first data line 171a and the second light blocking member 220b overlapping the second data line 171b.

Accordingly, areas of the opened areas of the first pixel PXA, the second pixel PXB and the third pixel PXC may be different from each other.

However, according to another exemplary embodiment of the invention, any one of the fourth interval GG1, the fifth interval GG2 and the sixth interval GG3 may be larger or smaller than the remaining intervals. That is, an area of the opened area of any one pixel among the first pixel PXA, the second pixel PXB and the third pixel PXC displaying the different colors may be larger or smaller than the areas of the opened areas of the remaining two pixels.

As described above, in the liquid crystal display according to the exemplary embodiment of the invention, the widths of the sequentially disposed data lines 171a, 171b and 171c are the same as each other, but the intervals between the adjacent data lines 171a, 171b and 171c or the intervals between the adjacent light blocking members 220a, 220b and 220c are provided to be different from each other, so that the areas of the opened areas of the first pixel PXA, the second pixel PXB and the third pixel PXC may be provided to be different from each other.

The areas of the opened areas of the first pixels PXA, the second pixel PXB and the third pixel PXC may be different by approximately 20% based on the area of the opened area of any one pixel. More specifically, compared to the area of the opened area of the first pixel PXA, the area of the opened area of the second pixel PXB may be larger or smaller than the area of the opened area of the first pixel PXA within approximately 20%.

As described above, the area of the opened area of at least one of the first pixel PXA, the second pixel PXB and the third pixel PXC displaying the different colors is provided to be different from the areas of the opened areas of the remaining pixels, so that when the same common voltage and data voltage are applied to the respective pixels PXA, PXB and PXC displaying the different colors, it is possible to adjust brightness represented by the respective pixels PXA, PXB and PXC to be equal, thereby improving a color reproduction property of the liquid crystal display.

Referring to FIG. 7, first widths W1 of and tenth intervals S1 between a plurality of branch electrodes 192 of the first pixel electrode 191a of the first pixel PXA are different from second widths W2 of and eleventh intervals S2 between the plurality of branch electrodes 192 of the second pixel electrode 191b of the second pixel PXB. Similarly, the second widths W2 of and the eleventh intervals S2 between the plurality of branch electrodes 192 of the second pixel electrode 191a of the second pixel PXB are different from third widths W3 of and twelfth intervals S3 between the plurality of branch electrodes 192 of the third pixel electrode 191c of the third pixel PXC. Further, the third widths W3 of and the twelfth intervals S3 between the plurality of branch electrodes 192 of the third pixel electrode 191c of the third pixel PXC are different from the first widths W1 of and the tenth intervals S1 between the plurality of branch electrodes 192 of the first pixel electrode 191a of the first pixel PXA.

However, according to another exemplary embodiment of the invention, widths of and intervals between the branch electrodes of the pixel electrode of any one pixel among the first widths W1 of and the tenth intervals S1 between the plurality of branch electrodes 192 of the first pixel electrode 191a of the first pixel PXA, the second widths of W2 of and the eleventh intervals S2 between the plurality of branch electrodes 192 of the second pixel electrode 191b of the second pixel PXB and the third widths W3 of and the twelfth intervals S3 between the plurality of branch electrodes 192 of the third pixel electrode 191c of the third pixel PXC may be different from the widths and the intervals of the branch electrodes of the pixel electrodes of other two pixels.

Further, according to the illustrated exemplary embodiment, it is described that a number of the plurality of branch electrodes 192 of the first pixel electrode 191a of the first pixel PXA, a number of the plurality of branch electrodes 192 of the second pixel electrode 191b of the second pixel PXB, and a number of the plurality of branch electrodes 192 of the third pixel electrode 191c of the third pixel PXC are the same. However, according to a liquid crystal display according to another exemplary embodiment of the invention, a number of the plurality of branch electrodes 192 of the first pixel electrode 191a of the first pixel PXA, a number of the plurality of branch electrodes 192 of the second pixel electrode 191b of the second pixel PXB, and a number of the plurality of branch electrodes 192 of the third pixel electrode 191c of the third pixel PXC may be different from each other.

Referring to FIG. 7, the second pixel electrode 191b of the second pixel PXB includes a first protrusion 193a provided with no opening defining the branch electrodes 192, and the third pixel electrode 191c of the third pixel PXC includes a second protrusion 193b provided with no opening defining the branch electrodes 192. That is, an opening which defines branch electrodes is not defined in the first protrusion 193a of the second pixel PXB and the second protrusion 193b of the third pixel PXC. The first protrusion 193a of the second pixel PXB and the second protrusion 193b of the third pixel PXC may also overlap the light blocking member 220.

In the illustrated exemplary embodiment, the second width W2 of the branch electrode 192 of the second pixel electrode 191b of the second pixel PXB and the third width W3 of the branch electrode 192 of the third pixel electrode 191c of the third pixel PXC is smaller than the first width W1 of the branch electrode 192 of the first pixel electrode 191a of the first pixel PXA. However, the second pixel electrode 191b of the second pixel PXB includes the first protrusion 193a provided with no opening defining the branch electrodes 192, and the third pixel electrode 191c of the third pixel PXC includes the second protrusion 193b provided with no opening defining the branch electrodes 192, so that an area of the second pixel electrode 191b and an area of the third pixel electrode 191c may be substantially the same as an area of the first pixel electrode 191a.

As described above, the areas of the pixel electrodes 191a, 191b and 191c of the plurality of pixels PXA, PXB and PXC displaying the different colors are provided to be the same as each other, so that it is possible to provide overlapping areas of the common electrode 270 and the pixel electrodes 191a, 191b and 191c to be the same as each other. Accordingly, the areas of the opened areas of the plurality of pixels PXA, PXB and PXC displaying the different colors are provided to be different from each other, and the sizes of storage capacitances of the plurality of pixels PXA, PXB and PXC displaying the different colors are provided to be the same as each other, thereby effectively preventing a difference in the kickback voltages, and thus effectively preventing display quality deterioration.

Further, the positions and the shapes of the respective thin film transistors Qa, Qb and Qc connected to the first pixel electrode 191a of the first pixel PXA, the second pixel electrode 191b of the second pixel PXB and the third pixel electrode 191c of the third pixel PXC, respectively, may be the same as each other.

Specifically, the shapes of the first gate electrode 124a of the first pixel PXA, the second gate electrode 124b of the second pixel PXB and the third gate electrode 124c of the third pixel PXC are the same as each other, and a seventh interval Da between the first gate electrode 124a of the first pixel PXA and the second gate electrode 124b of the second pixel PXB, an eighth interval Db between the second gate electrode 124b of the second pixel PXB and the third gate electrode 124c of the third pixel PXC and a ninth interval Dc between the third gate electrode 124c of the third pixel PXC and the first gate electrode 124a of the first pixel PXA are substantially the same as each other. Further, the channel lengths D and the channel widths W of the respective thin film transistors Qa, Qb and Qc connected to the first pixel electrode 191a of the first pixel PXA, the second pixel electrode 191b of the second pixel PXB and the third pixel electrode 191c of the third pixel PXC may be the same as each other. Accordingly, in the liquid crystal display according to the illustrated exemplary embodiment, the shapes and the intervals of the gate electrodes 124a, 124b and 124c of the thin film transistors Qa, Qb and Qc of the plurality of pixels PXA, PXB and PXC displaying the different colors are provided to be substantially the same as each other, and the channel lengths D and the channel widths W of the thin film transistors Qa, Qb and Qc are provided to be substantially the same as each other while the areas of the opened areas of the plurality of pixels PXA, PXB and PXC displaying the different colors are provided to be different from each other, thereby effectively preventing display quality deterioration such as a brightness difference.

Referring to FIG. 7, the first source electrode 173a of the first pixel PXA is extended substantially parallel to the first data line 171a. However, a second source electrode 173b of the second pixel PXB is not parallel to the second data line 171b, and the second data line 171b and the second source electrode 173b are connected with each other through a first oblique portion 172a. Further, a third source electrode 173c of the third pixel PXC is not parallel to the third data line 171c, and the third data line 171c and the third source electrode 173c are connected with each other through a second oblique portion 172b. Lengths of the first oblique portion 172a and the second oblique portion 172b may be different from each other. However, a liquid crystal display according to another exemplary embodiment does not include the first oblique portion 172a connecting the second data line 171b and the second source electrode 173b of the second pixel PXB with each other and the second oblique portion 172b connecting the third data line 171c and the third source electrode 173 of the third pixel PXC with each other. Further, similar to the display according to the exemplary embodiment illustrated in FIG. 5, in order to effectively prevent a disconnection of the second source electrode 173b and the third source electrode 173c, the second data line 171b and the third data line 171c are extended up to the first extended portion 174a and the second extended portion 174b of the second source electrode 173b and the third source electrode 173c disposed to overlap the edges of the second gate electrode 124b and the third gate electrode 124c to be connected with the second source electrode 173b and the third source electrode 173c.

According to the illustrated exemplary embodiment, the storage capacitances of the respective pixels are maintained to be equal to each other by providing the overlapping areas of the pixel electrodes and the common electrodes of the respective pixels to be the equal to each other, and the shapes and the intervals of the gate electrodes 124a, 124b and 124c of the thin film transistors Qa, Qb and Qc, and the channel lengths D and the channel widths W of the thin film transistor are provided to be equal to each other while improving a color reproduction property of the liquid crystal display, thereby effectively preventing display quality deterioration.

Many characteristics of the liquid crystal displays according to the exemplary embodiments previously described with reference to FIGS. 1 and 2, FIGS. 3 and 4, and FIG. 5, and many characteristics of the liquid crystal display according to the exemplary embodiment described with reference to FIG. 6 are applicable to the liquid crystal display according to the illustrated exemplary embodiment with reference to FIG. 7.

According to the aforementioned exemplary embodiments, it is described that the common electrode and the pixel electrode, which are the two electric field generating electrodes, overlap with the insulating layer interposed therebetween, the common electrode is disposed under the insulating layer and the pixel electrode is disposed on the insulating layer, but according to another exemplary embodiment of the invention, the pixel electrode may be disposed under the insulating layer, and the common electrode may be disposed on the insulating layer. Further, according to the aforementioned exemplary embodiments, it is described that the pixel electrode includes the plurality of branch electrodes, but according to another exemplary embodiment of the invention, the common electrode may include the plurality of branch electrodes. Further, according to another exemplary embodiment of the invention, a third electric field generating electrode disposed on the upper display panel may be further provided.

Further, according to the aforementioned exemplary embodiments, it is described that the common electrode and the pixel electrode, which are the two electric field generating electrodes, overlap with the insulating layer interposed therebetween, any one of the two electric field generating electrodes is a plate shape, and the remaining electrode has the branched portion, but the invention is not limited thereto, and may be applied to other various types of thin film transistor display panels having two electric field generating electrodes on a single display panel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a plurality of pixels which includes a first pixel, a second pixel and a third pixel, which display different colors and are sequentially disposed;
a plurality of data lines which includes a first data line, a second data line and a third data line sequentially and repeatedly disposed; and
a first pixel electrode disposed at the first pixel, a second pixel electrode disposed at the second pixel and a third pixel electrode disposed at the third pixel,
wherein
the first data line is disposed between the third pixel and the first pixel, the second data line is disposed between the first pixel and the second pixel, and the third data line is disposed between the second pixel and the third pixel,
widths of the first data line, the second data line and the third data line are substantially the same as each other, and
a first interval between the first data line and the second data line is different from at least one of a second interval between the second data line and the third data line and a third interval between the third data line and the first data line.

2. The liquid crystal display of claim 1, further comprising:
a common electrode which overlaps the first pixel electrode, the second pixel electrode and the third pixel electrode,
wherein a first overlapping area between the first pixel electrode and the common electrode is the same as a second overlapping area between the second pixel electrode and the common electrode, and
the second overlapping area between the second pixel electrode and the common electrode is the same as a third overlapping area between the third pixel electrode and the common electrode.

3. The liquid crystal display of claim 2, wherein:
the first pixel electrode, the second pixel electrode and the third pixel electrode each include a plurality of branch electrodes defined by an opening,
widths of and intervals between the plurality of branch electrodes of the first pixel electrode are substantially the same as widths of and intervals between the plurality of branch electrodes of the second pixel electrode, and
the widths of and the intervals between the plurality of branch electrodes of the second pixel electrode are substantially the same as widths of the plurality of branch electrodes of the third pixel electrode and intervals between the plurality of branch electrodes of the third pixel electrode.

4. The liquid crystal display of claim 3, wherein:
a number of plurality of branch electrodes of the first pixel electrode is different from at least one of a number of plurality of branch electrodes of the second pixel electrode and a number of plurality of branch electrodes of the third pixel electrode.

5. The liquid crystal display of claim 4, wherein:
the second pixel electrode further includes a first protrusion provided with no opening, and
the third pixel electrode further includes a second protrusion provided with no opening.

6. The liquid crystal display of claim 2, wherein:
the first pixel electrode, the second pixel electrode and the third pixel electrode each include a plurality of branch electrodes defined by an opening,
widths of and intervals between the plurality of branch electrodes of the first pixel electrode are different from widths of and intervals between the plurality of branch electrodes of the second pixel electrode, and
the widths of and the intervals between the plurality of branch electrodes of the second pixel electrode are different from widths of and intervals between the plurality of branch electrodes of the third pixel electrode.

7. The liquid crystal display of claim 6, wherein:
the second pixel electrode further includes a first protrusion provided with no opening, and
the third pixel electrode further includes a second protrusion provided with no opening.

8. The liquid crystal display of claim 2, further comprising:
a first thin film transistor connected with the first data line and the first pixel electrode;
a second thin film transistor connected with the second data line and the second pixel electrode; and
a third thin film transistor connected with the third data line and the third pixel electrode,
wherein
a channel width and a channel length of the first thin film transistor is the same as a channel width and a channel length of the second thin film transistor, and
the channel width and the channel length of the second thin film transistor is the same as a channel width and a channel length of the third thin film transistor.

9. The liquid crystal display of claim 8, further comprising:
a gate line which includes a first gate electrode of the first thin film transistor, a second gate electrode of the second thin film transistor and a third gate electrode of the third thin film transistor, wherein
the first gate electrode, the second gate electrode and the third gate electrode have substantially the same shape, and
the first gate electrode, the second gate electrode and the third gate electrode are sequentially disposed at a predetermined interval.

10. The liquid crystal display of claim 9, wherein:
a first source electrode of the first thin film transistor is extended substantially parallel to the first data line,
a second source electrode of the second thin film transistor includes a first extended portion which overlaps an edge of the second gate electrode,
the second data line is connected with the first extended portion,
a third source electrode of the third thin film transistor includes a second extended portion which overlaps an edge of the third gate electrode, and
the third data line is connected with the second extended portion.

11. The liquid crystal display of claim 8, wherein:
a first source electrode of the first thin film transistor is extended substantially parallel to the first data line,
a second source electrode of the second thin film transistor is connected with the second data line through a first oblique portion,
a third source electrode of the third thin film transistor is connected with the third data line through a second oblique portion, and
lengths of the first oblique portion and the second oblique portion are different from each other.

12. The liquid crystal display of claim 2, further comprising:
a first light blocking member which overlaps the first data line;
a second light blocking member which overlaps the second data line; and
a third light blocking member which overlaps the third data line,
wherein a width of the first light blocking member is substantially the same as a width of the second light blocking member and a width of the third light blocking member.

13. The liquid crystal display of claim 2, further comprising:
a first light blocking member which overlaps the first data line;
a second light blocking member which overlaps the second data line; and
a third light blocking member which overlaps the third data line,
wherein a width of the first light blocking member is different from at least one of a width of the second light blocking member and a width of the third light blocking member.

14. The liquid crystal display of claim 1, wherein:
the first pixel electrode, the second pixel electrode and the third pixel electrode each include a plurality of branch electrodes defined by an opening,
widths of and intervals between the plurality of branch electrodes of the first pixel electrode are substantially the same as widths of and intervals between the plurality of branch electrodes of the second pixel electrode, and
the widths of and the intervals between the plurality of branch electrodes of the second pixel electrode are substantially the same as widths of and intervals between the plurality of branch electrodes of the third pixel electrode.

15. The liquid crystal display of claim 14, wherein:
a number of plurality of branch electrodes of the first pixel electrode is different from at least one of a number of plurality of branch electrodes of the second pixel electrode and a number of plurality of branch electrodes of the third pixel electrode.

16. The liquid crystal display of claim 15, wherein:
the second pixel electrode further includes a first protrusion provided with no opening, and
the third pixel electrode further includes a second protrusion provided with no opening.

17. The liquid crystal display of claim 1, wherein:
the first pixel electrode, the second pixel electrode and the third pixel electrode each include a plurality of branch electrodes defined by an opening,
widths of and intervals between the plurality of branch electrodes of the first pixel electrode are different from widths of and intervals between the plurality of branch electrodes of the second pixel electrode, and
the widths of and the intervals between the plurality of branch electrodes of the second pixel electrode are different from widths of and intervals between the plurality of branch electrodes of the third pixel electrode.

18. The liquid crystal display of claim 17, wherein:
the second pixel electrode further includes a first protrusion provided with no opening, and
the third pixel electrode further includes a second protrusion provided with no opening.

19. The liquid crystal display of claim 1, further comprising:
a first thin film transistor connected with the first data line and the first pixel electrode;
a second thin film transistor connected with the second data line and the second pixel electrode; and
a third thin film transistor connected with the third data line and the third pixel electrode,
wherein
a channel width and a channel length of the first thin film transistor is the same as a channel width and a channel length of the second thin film transistor, and
the channel width and the channel length of the second thin film transistor is the same as a channel width and a channel length of the third thin film transistor.

20. The liquid crystal display of claim 19, further comprising:
a gate line which includes a first gate electrode of the first thin film transistor, a second gate electrode of the second thin film transistor, and a third gate electrode of the third thin film transistor,
wherein the first gate electrode, the second gate electrode, and the third gate electrode have substantially the same shape, and
the first gate electrode, the second gate electrode and the third gate electrode are sequentially disposed at a predetermined interval.

21. The liquid crystal display of claim 20, wherein:
a first source electrode of the first thin film transistor is extended substantially parallel to the first data line,
a second source electrode of the second thin film transistor includes a first extended portion which overlaps an edge of the second gate electrode,
the second data line is connected with the first extended portion, a third source electrode of the third thin film transistor includes a second extended portion which overlaps an edge of the third gate electrode, and the third data line is connected with the second extended portion.

22. The liquid crystal display of claim 19, wherein:

a first source electrode of the first thin film transistor is extended substantially parallel to the first data line, a second source electrode of the second thin film transistor is connected with the second data line through a first oblique portion, a third source electrode of the third thin film transistor is connected with the third data line through a second oblique portion, and lengths of the first oblique portion and the second oblique portion are different from each other.

23. The liquid crystal display of claim 1, further comprising:

a first light blocking member which overlaps the first data line;

a second light blocking member which overlaps the second data line; and a third light blocking member which overlaps the third data line, wherein a width of the first light blocking member is substantially the same as a width of the second light blocking member and a width of the third light blocking member.

24. The liquid crystal display of claim 1, wherein:

a first light blocking member which overlaps the first data line;

a second light blocking member which overlaps the second data line;

a third light blocking member which overlaps the third data line, wherein a width of the first light blocking member is different from at least one of a width of the second light blocking member and a width of the third light blocking member.

* * * * *